Feb. 12, 1963     L. P. F. VAN DER GRINTEN ET AL     3,077,401
PROCESS FOR THE DOSAGE OF THE EXPOSURE DURING THE COPYING
OF POSITIVE LINE-ORIGINALS ON DIAZOTYPE MATERIAL
Filed Oct. 7, 1958                                2 Sheets-Sheet 1
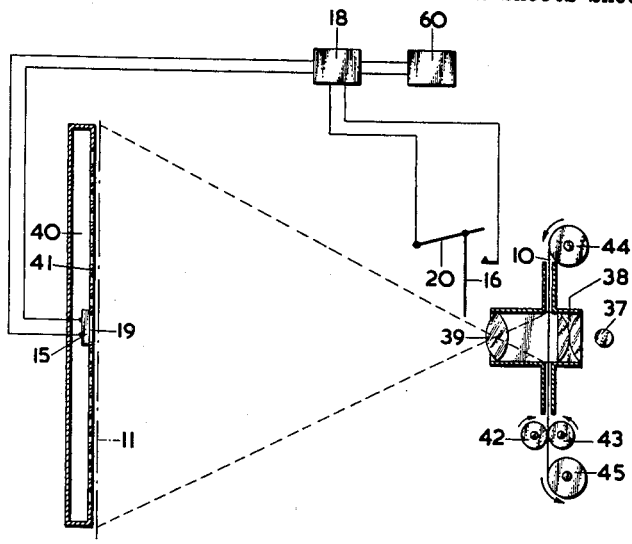
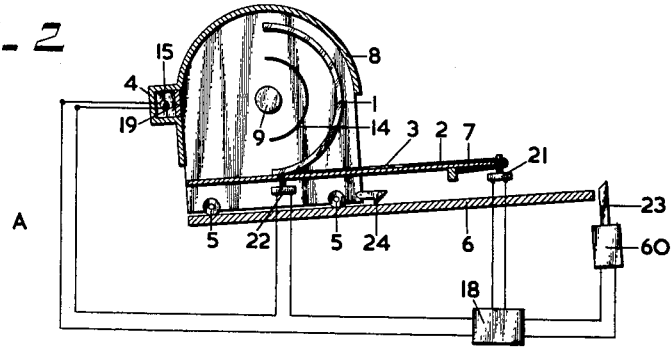
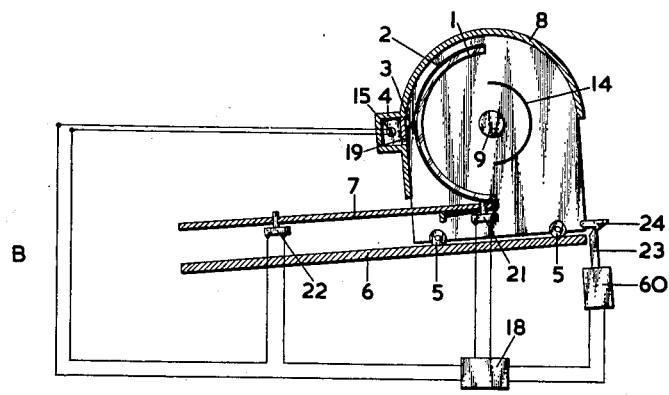
INVENTORS
LODEWIJK P. F. VAN DER GRINTEN
GERARDUS J. H. VAN BEEK
BY
ATTORNEYS

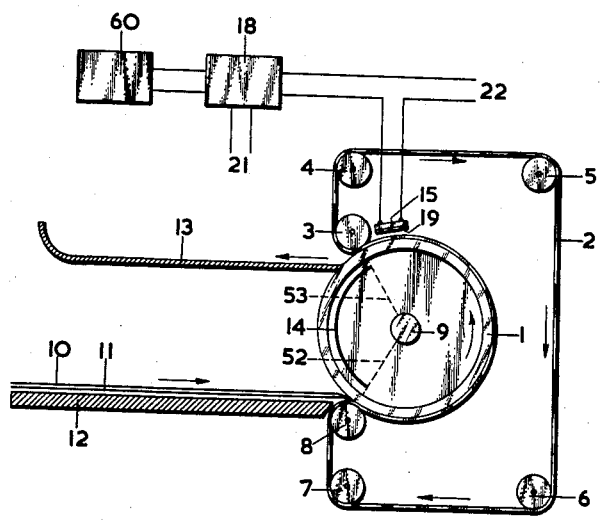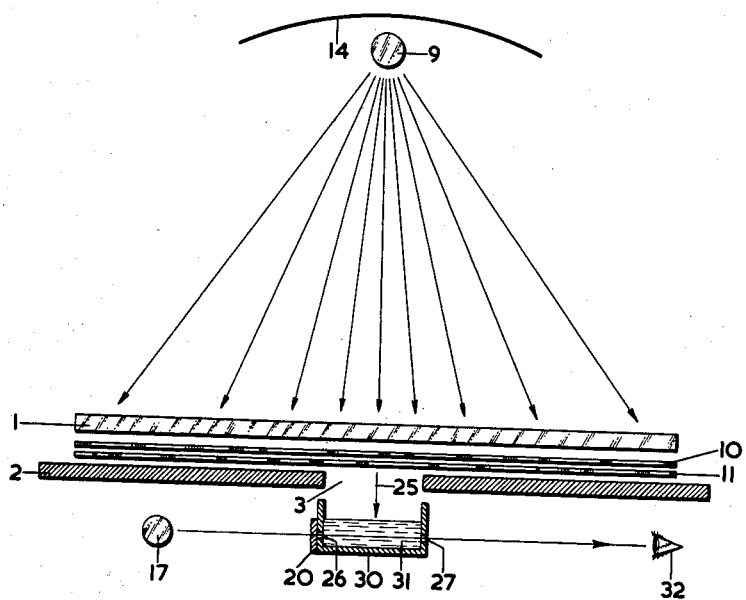

3,077,401
PROCESS FOR THE DOSAGE OF THE EXPOSURE DURING THE COPYING OF POSITIVE LINE-ORIGINALS ON DIAZOTYPE MATERIAL
Lodewijk Pieter Frans van der Grinten and Gerardus Joseph Henricus van Beek, Venlo, Netherlands, assignors to Chemische Fabriek L. van der Grinten N.V., Venlo, Netherlands, a corporation of Netherlands
Filed Oct. 7, 1958, Ser. No. 765,906
Claims priority, application Netherlands Oct. 7, 1957
7 Claims. (Cl. 96—27)

The invention relates to a process for the dosage of the exposure during the copying by transmitted light of positive line-originals, such as tracings, letters, microfilm images and the like, on diazotype material, in non-continuously operating exposure apparatus.

According to the present invention a process for the dosage of the exposure during the transmission-copying of positive line-originals on diazotype material in non-continuously operating exposure apparatus which comprises measuring the quantity of light (integral of intensity and time) which is transmitted by the original and the diazotype material during the copying operation, the said light being of such a wavelength that it is transmitted progressively in greater intensity by the diazo layer as the photolysis of the diazo compound proceeds, and terminating the exposure when the said quantity reaches a predetermined value.

The invention provides, either automatically or non-automatically and with an accuracy sufficient in practice, an equivalent degree of exposure when mutually different originals are copied successively, among other things independently of the light-transmission properties of each original copied. This is particularly important when weak originals, such as pencil-tracings and typed letters, are to be copied.

A process for the dosage of the exposure, in which, as in the process according to the present invention, the light transmitted by the original and the light-sensitive material during the copying process is used as measuring light and in which its quantity forms the measure of the dosage is known for copying negatives on photographic copying-paper. In this process the darkest portion of the image is selected in each case and in this portion all the light transmitted by the negative and the photographic copying-paper during the exposure is recorded photoelectrically. The exposure is terminated as soon as a given quantity of electric energy has been supplied by the photoelectric element to an integrating circuit. This quantity is previously determined by experimental calibration of the system consisting of the photographic copying-paper and the electric recording means. It is naturally so chosen that the desired exposure of the copying-paper is obtained in the darkest portion of the image.

If the photographic copying-paper is the same in each copying process and if, as is the case with such paper, its light-transmission remains constant during the exposure, it is clear how the quantity of electric energy determined by the quantity of measuring light can form the measure of the quantity of light that has fallen in each case on the photographic copying-paper in the darkest image portion, and consequently of the degree of exposure of the copying-paper thus obtained, and that this degree of exposure will be obtained irrespective of the light-transmission (degree of blackness) which the successively copied negatives have in this portion.

If this process is employed in the process of copying positive line-originals, the choice of a given image portion is naturally unnecessary; at least such a choice, if it takes place at all for the purpose of obtaining greater accuracy, takes on another significance than when negatives are copied. If the process is then applied for copying on the usual diazotype materials, while making use of the sources of radiation suited for such copying, such as the arc-lamp and the mercury vapour lamp, the independence of the light-transmission appears not to exist. With diazotype copies, particularly with those of letters, great differences in the obtained degree of exposure will sometimes occur. Only of some letters (apparently those which show sufficient resemblance to the letter with which the experimental calibration for correct exposure was carried out) are copies obtained which have been exposed sufficiently correctly for practical purposes. The copies of the other letters are underexposed to a degree undesirable for practical purposes (the positive image in the copy does not contrast strongly enough with the excessively foggy background) or overexposed (the background is indeed only slightly foggy, if at all, but the image has been weakened).

These deviations are probably to be attributed to the position of the spectral range in which the diazo layers of the commonly used diazotype materials are light-sensitive and to the limited scope of that range. To this has to be added the circumstance that the light-transmission for this limited range of the spectrum as compared with that for other ranges of the spectrum, differs with different originals. The present invention surprisingly leads to adaptation to these circumstances. It avoids the deviations by using as measuring light only the light of the limited spectral range to which the diazo layer is light-sensitive and which is transmitted during the copying process by the original and the light-sensitive material.

The diazo layer—and this holds good and is known for all diazo layers commonly used in the diazotype process—during the copying process transmits from moment to moment the light of this limited spectral range to a constantly varying degree, at first to a small, later to a greater extent, so that the quantity of this light (of an intensity constantly varying during the process) recorded through the diazo layer during the copying process could not be expected to be the measure of the quantity of light (which is not subject to this variation of intensity) that has fallen on the diazo layer through the original.

In spite of this it has appeared that the process according to the invention, in which the quantity of this measuring light that constantly varies in intensity is a measure of the dosage, yields excellent results, even to the extent that it makes it possible within certain limits, after experimental calibration for correct exposure of a given diazotype material, to produce copies that have been exposed sufficiently correctly for practical purposes, not only independently of the light-transmission properties of each original copied, but even independently of whether the quantity of diazo compound per surface unit in the diazotype material used for copying is different from that of the material which was used for calibration.

The process according to the invention may, for example, be carried out as follows:

Commonly used photoprinting paper of weight 80 g./m.$^2$, sensitized with a para-diazo-dialkylaniline, is exposed in a printing frame under a sheet of paper typed on one side. Behind a window in the rear wall of the printing frame a light-filter for wavelength 380 millimicrons is present and behind this a vacuum photocell, type Philips 90 AV, adequately protected from light other than that falling through the filter. Exposure is carried out with the light of an 18-amp alternating-current arc-lamp with an airtight arc, operating at an arc voltage of approximately 160 volts. The light of the arc-lamp is rich in the wavelength of 380 millimicrons serving as the measuring light, and the diazo layer of the photoprinting paper has for light of this wavelength an absorption which decreases during the exposure.

The electric energy supplied by the photocell is fed to an integrating circuit controlling an electric discharge tube. The discharge tube in its turn controls an electric, for example an acoustic, signal device, which responds to disruptive discharge of the discharge tube. This response involves the termination of the exposure. By variation of the capacity of the integrating circuit and/or by variation of other factors, such as the light-transmission between diazo layer and photocell in the measuring zone, the voltage on the photocell, and the like, the moment of termination of the exposure can be shifted and the dosage changed accordingly, and the system can thus be calibrated for any desired greater or smaller exposure.

Once a system has been found with a dosage point at which a desired degree of exposure is obtained, during the process of successively copying originals of varying light-transmission every exposure of diazotype material sensitized with the same diazo compound, carried out with the same light-source, provided that it is terminated when the dose has been reached, will yield a copy with this particular degree of exposure, independently of the power and of fluctuations of the light-source, and in practice substantially independently of the absorption of the light portions of the originals successively copied.

As has been said, the dosage is dependent on the light-transmission, for the chosen measuring light, of the path between diazo layer and photocell. Thus it is dependent on the light-transmission, for the measuring light, of the support on which the diazo layer is present (at any rate in those cases in which the latter is located between the diazo layer and the photocell), on the light-transmission of a conveyor belt or other material, if any is present and finally of course also on the light-transmission, for the measuring light, of the light-filter. All these factors may be kept constant or, as already indicated, may be consciously varied for the calibration of the dosage.

According to the intensity of the light-source, the absorption of the light portions of the line-original, the quantity of diazo compound in the diazotype material, the exposure will last longer or shorter, but within wide limits this has no appreciable influence upon the dosage to the desired degree of exposure.

In the case described above the measuring light has substantially the wavelength for which the diazo layer has its maximum absorption. For the process according to the invention, however, it is also possible to use measuring light of a wavelength which does lie within the absorption range of the diazo compound used but not at its absorption maximum. Such a case presents itself when the above-mentioned diazotype material is exposed with the mercury vapour lamp. In this case, measuring light of wavelength 365 millimicrons may be used; the light of a mercury vapour lamp is rich in rays of this wavelength.

The process according to the invention yields particularly good results when copying takes place with a mercury vapour lamp on diazotype material which contains one or more of the following diazo compounds:

Para-diazodialkylaniline,
Para-diazodiphenylamine,
Para-diazo-ortho-alkyldialkylaniline,
Para-diazo-ortho-halogenodialkylaniline,
Para-diazo-ortho-alkoxydialkylaniline, and
Diazo-dialkylhydroquinone having an etherified mercapto group in the para-position with respect to the diazo group, if at the same time 405 millimicrons is chosen as wavelength for the measuring light. At least equally good results are obtained when copying takes place with the light of a mercury vapour lamp on diazotype material sensitized with diazo-dialkylhydroquinone having an aryl group in the para-position with respect to the diazo group, with measuring light of wavelength 405 and/or of 436 millimicrons.

In practice, when fifty letters of the most divergent light-transmission (greatest variation 1 to approximately 25) were each copied in the manner described with the light of a mercury vapour lamp on a representative of the above mentioned diazotype materials, while dosing with measuring light of 405 millimicrons, the diazotype copies obtained in each case had substantially the degree of exposure for which the system had been calibrated. The deviations were negligible for practical purposes.

In the foregoing it has been pointed out that the process according to the invention makes it possible under favourable circumstances, after experimental calibration for the right exposure of a given diazotype material, to produce copies that have been exposed sufficiently correctly for practical purposes, not only independently of the light-transmission properties of each original copied but to some extent even independently of the quantity of diazo compound which the diazotype material contains per surface unit. The latter independence exists in the cases described in the foregoing if the diazo layers, as usual in the commercial diazotype materials, contain 0.25 or more millimols of diazo compound per m.$^2$. The exposures are still reasonably correct if the quantity of diazo compound fluctuates, for example, with a factor 2. The following may serve as an example:

Diazotype material, sensitized with a para-diazo-ortho-alkoxydialkylaniline is exposed through typed letters with a high-pressure mercury vapour lamp. Wavelength 405 millimicrons is used as measuring light. The letters are copied variously on diazotype material containing 0.3, 0.45, and 0.6 millimol of diazo compound per m.$^2$ respectively.

The calibration takes place under any given letter, for example on the material containing 0.45 millimol of diazo compound per m.$^2$. Typed letters are generally looked upon as weak originals. They are therefore preferably copied with a certain under-exposure. The system is calibrated for such a degree of exposure.

Notwithstanding the circumstance that the light-sensitivity of diazotype material is approximately inversely proportional to the quantity of diazo compound per surface unit, so that, the exposure circumstances remaining constant, the exposure times are approximately directly proportional to this quantity, all the copies show a degree of under-exposure suitable in practice without the dosage being changed in any way.

Some examples of combinations of light-source, diazotype material, and light-filter suitable for the process according to the invention are:

(1) Light-source: arc-lamp.
Diazo layer: one or more para-diazo-dialkylanilines.
Light-filter: the following combination—
  W.G. 1, 2 mm. thick, of the firm of Schott & Gen., Jena, Germany
  U.G. 1, 2 mm. thick, of the firm of Schott & Gen., Jena, Germany of the following transmissions—
    At 360 millimicrons appr. 4%
    At 380 millimicrons appr. 32%.
    At 400 millimicrons appr. 4%
Outside of the range of 360–400 millimicrons the transmission is negligible in practice.

(2) Light-source: actinically fluorescent mercury vapour lamp, type "TL" 65/5 of Philips, Eindhoven.
Diazo layer: one or more of the following diazo compounds—
  Para-diazo-dialkylaniline,
  Para-diazo-diphenylamine, Para-diazo-ortho-alkyldialkylaniline,
Para-diazo-ortho-halogen-dialkylaniline,
Para-diazo-ortho-alkoxy-dialkylaniline, and
Diazo-dialkylhydroquinone having an etherified mercapto group in the para-position with respect to the diazo group.

Light-filter: the combination filter "Narrow Band Pass Filter Color Spec. No. 5-62" of Corning Glass Works, Corning, N.Y., U.S.A., of the following transmissions—
At 385 millimicrons appr. 5%
At 405 millimicrons appr. 8%
At 425 millimicrons appr. 0%
Outside the range of 385-425 millimicrons the transmission is negligible in practice.

(3) Light-source: high-pressure mercury vapour lamp.
Diazo layer: one or more para-diazo-monoalkylanilines.
Light-filter: interference filter for 365 millimicrons.

(4) Light-source: high-pressure mercury vapour lamp.
Diazo layer: one or more diazo-dialkylhydroquinones having an aryl group in the para-position with respect to the diazo group.
Light-filter: interference filter for 436 millimicrons.

The calibration repeatedly mentioned in the foregoing preferably takes place in the exposure apparatus (adapted for carrying out the process) in which the copying process is to take place.

This calibration may take place without an original. Preferably, however, it is carried out under an original, an then preferably under a portion of the original in which the lines cover a more or less normal percentage of the total surface. During the copying an image portion with a more or less normal percentage of lines is then also preferably present in the measuring zone. Without this precaution deviations will occur. Only in extreme cases, however, are these so great that the practical requirements are not met.

The following examples will serve to illustrate the invention:

*Example 1*

Calibration takes place without an original.
The material copied is:
A letter, with its non-written portion in the measuring zone; degree of exposure exactly as during calibration. The same letter, but this time with a closely typed portion in the measuring zone; degree of exposure slightly higher than during calibration (deviation inappreciable in practice). A tracing made with Indian ink, with its non-drawn portion in the measuring zone; degree of exposure exactly as during calibration.

The same tracing, but this time with a closely hatched portion in the measuring zone; degree of exposure slightly higher than during calibration.

*Example 2*

Calibration takes place with the closely typed portion of the letter in the measuring zone.
The material copied is:
The letter, with its non-written portion in the measuring zone; degree of exposure slightly lower than during calibration.
The same letter, with its closely typed portion in the measuring zone; degree of exposure exactly as during calibration.

*Example 3*

Calibration takes place with the closely hatched portion of the tracing in the measuring zone.
The material copied is:
The tracing, with its non-drawn portion in the measuring zone; degree of exposure slightly lower during calibration.
The same tracing, with its closely hatched portion in the measuring zone; degree of exposure exactly as during calibration.

Recalibration will be desirable after changes have been made in the apparatus, such as replacement of the applying or conveyor belt, the photoelectric element, the components of the integrating circuit, and the like; upon replacement of the light-source by one of a different type, or of the light-filter, when a diazotype paper with another support, for example of weight 110 g./m.$^2$ instead of 80 g./m.$^2$, is going to be used; when a diazotype material with another type of diazo compound is going to be used.

On carrying out the process according to the invention, the integrating circuit may naturally control—if desired, via a discharge tube—instead of, or in addition to, a signal device, a reaction device which automatically terminates the exposure or causes its termination. Such a reaction device may, for example, extinguish the light-source, put a screen between the light-source and the photoprinting set, remove the photoprinting set from the plane of exposure, or displace the plane of exposure or cause a change in its direction (compare FIG. 2 and the explanation relating to it). For the expert there are numerous possibilities for attaining automatic operation.

Besides the electrical method a photochemical way of recording the quantity of measuring light can also be used in the process according to the invention, for example such as are based on the bleaching-out of a liquid. This embodiment has been illustrated in FIGURE 4. It is less simple than that with the electrical recording method.

The present invention not only includes the process set forth above but also includes apparatus for carrying out this process.

Four devices for carrying out the process according to the invention are illustrated diagrammatically in the accompaying drawings. In these drawings a number of details not strictly necessary have for simplicity's sake been omitted.

In the apparatus according to FIGURES 1, 2 and 3 the measuring light is recorded electrically, in FIGURE 4 photochemically.

FIGURE 1 represents diagrammatically, partly in section, a device for the dosage of the exposure in the transmission-copying process, equipped with a photocell, an electric integrating circuit, and a signal device (but otherwise intended for manual operation).

In this figure, 10 is a positive microfilm of printed matter an image of which is projected on a sheet of diazotype material 11 with the aid of light-source 37, condensor system 38, and objective 39. By means of the transport rollers 42 and 43 the images of microfilm 10 are successively brought forward from roller 44 into the beam of light, and there they come to a standstill. The film after copying, is wound onto take-up roller 45. Sheet 11 is held on perforated wall 41 by means of a vaccum in box 40. In box 40, photocell 15, with filter 19 in front of it, is mounted for recording the measuring light transmitted by diazotype material 11 during the exposure. This photocell is connected with the integrating circuit 18 comprising a discharge tube. When photocell 15 has recorded the quantity of measuring light found desirable during calibration and has supplied the quantity of electric energy determined thereby to circuit 18, and when consequently a disruptive discharge of the discharge tube takes place, the latter causes the response of a signal device 60, which may, for example, be acoustic. After this, the light-screen 16 is put into the beam of light by the operator of the apparatus.

Sheet 11 is then taken from wall 41 and developed. The results of exposure are as described above, independently of any greater or smaller amount of fog that may be present in the micro-image copied and independently of whether this fog is or is not a neutral grey. Connected to light-screen 16 is a switch 20, which short-circuits the integrating capacitor of 18 when 16 is brought into the beam of light. When 16 is removed from the beam of light (i.e. before the next exposure), this short-circuit is broken again.

In FIGURE 2 a known office exposure-apparatus for copying letters and tracings of a limited size is represented in diagrammatical cross-section and in two positions A (loading position) and B (working position). In this figure, 8 is a casing adapted to move to and fro on small wheels 5 along slanting rails 6 between the loading position and the working position. Inside casing 8 mercury vapour lamp 9 and reflector 14 are present, which are stationary with respect to the casing. In the apparatus the plate-shaped table 7 and the rails 6 have a fixed position.

In loading position A an applying apron 2 with window 3 is stretched out on table 7. The right end of apron 2 has been folded back around table 7 and fixed at its lower side. At the left end apron 2 is connected with one edge of the semi-cylindrical pane 1 (in loading position A with the lower edge). Pane 1 is rotatable in a manner not shown, within the casing around an imaginary axis through the centre of light-source 9.

Upon the displacement of casing 8 from loading position A to working position B, pane 1 changes its position within the casing and in doing so takes apron 2 along with it. Its edge connected with apron 2 now lies on top.

If in loading position A a photoprinting set has been laid upon apron 2, in working position B this lies between pane 1 and apron 2, and is thus exposed to the light of the light-source 9.

The measuring light leaving the back of the photoprinting set in working position B strikes photocell 15, which is mounted in the light-tight box 4, through window 3 and filter 19.

The photocell is connected with the integrating circuit 18 comprising a discharge tube.

In working position B, casing 8 is held by means of pawl 23 and hook 24. When photocell 15 has recorded the quantity of measuring light found desirable during calibration and has supplied the quantity of electric energy determined thereby to circuit 18, and when consequently a disruptive discharge of the discharge tube takes place, this causes the excitation of electromagnet 60, upon which the latter pulls pawl 23 downwards.

The casing then rolls back automatically to loading position A on the slanting rails 6, and thus the exposure is terminated automatically when the dose to which the system has been calibrated has been reached. The results of the exposure are as described above.

The numerals 21 and 22 designate push button switches, which in their normal position (with protruding push button) transmit the current, and which interrupt it as long as they are depressed.

Switch 22 thus interrupts the current in loading position A and switch 21 in working position B.

Switch 21 is connected parallel with the integrating capacitor of the integrating circuit and thus short-circuits the latter in all positions except in working position B.

Switch 22 has been mounted between 15 and 18. This switch thus interrupts the connection between the photocell and the integrating circuit in loading position A and maintains it in all other positions.

FIGURE 3 is a diagrammatical sectional elevation of a known exposure apparatus with which copies can be made, discontinuously but yet vitually in flow production, of letters and tracings of a limited size. It is true that the apparatus is so arranged, or at any rate may be so arranged, that it can also operate continuously, but in its operation to be described more precisely below it operates discontinuously and copies originals of varying light-transmission, with dosage according to the invention.

In the figure, 2 is an endless conveyor belt, which, when moving, causes glass cylinder 1 to revolve around tube lamp 9, as indicated by an arrow. In doing so it runs over cylinder 1 and the rollers 3, 4, 5, 6, 7, and 8. Within the cylinder 1 screen 14 has been mounted, which limits the plane of exposure. The feeding limit of the plane of exposure is designated by 52; the discharge limit by 53.

The photoprinting set, consisting of original 10 and diazotype material 11, which has a length slightly smaller than that of the plane of exposure, is held in readiness on feeding-table 12 with its leading edge in the gutter between roller 8 and belt 2 on the one hand and cylinder 1 on the other hand. When belt 2 is started, the set is fed into the plane of exposure. When the set is in the middle of the plane of exposure, belt 2 is stopped. In the apparatus this takes place automatically by means of a cam disc with a stopping cam which makes a complete revolution while the belt 2 travels the distance necessary for the displacement in question of the set. The stopping cam disconnects the driving mechanism.

After the driving mechanism has been connected again, belt 2 carries the set beyond discharge limit 53 and thus withdraws it from further exposure. The exposed set is laid in a collecting tray 13. If in the meantime a new set had been put in readiness on feeding-table 12, this set has been introduced into the plane of exposure simultaneously with the removal of the preceding set. Belt 2 is stopped again automatically in the manner already described.

The process according to the invention is applied as follows in this copying process: Close to the discharge limit 53, behind a light-pervious part of belt 2, light-filter 19 and photocell 15 are mounted. Photocell 15 is connected to integrating circuit 18 and the latter acts upon reaction-element 60 in the manner indicated in the description of FIGURE 2.

Up to the moment at which the driving mechanism is disconnected and thus belt 2 is stopped, the connection between photocell 15 and integrating circuit 18 is interrupted at 22, while, for example by short-circuiting of its integrating capacitor at 21, the integrating circuit is out of operation. In this state of affairs reaction-element 60 is unexcited. However, when the belt is stopped, the connection is closed at 22 and interrupted at 21, by cooperation of a second cam (of the cam disc mentioned above) with a switch.

Thus the accumulation of energy in integrating circuit 18 starts at the moment the belt is stopped. After the quantity of energy determined by calibration has been recorded the integrating circuit energizes reaction-element 60 and this brings about renewed connection of the driving mechanism. The consequent displacement of the second cam cooperating with the switch now causes renewed interruption at 22 and renewed short-circuiting at 21 via this switch, as a result of which the excitation of reaction-element 60 is discontinued, and this condition is maintained till the cam again disconnects the driving mechanism.

Thus the cycle described above repeats itself, but this time with the dosage according to the invention, and all the copies made show the degree of exposure for which the system has been calibrated.

If photocell 15 is mounted in the place indicated in the figure, at this place the photoprinting set has already received a given pre-exposure remaining outside the dosage at the moment it is stopped. This pre-exposure is dependent on the time the set requires to transverse the plane of exposure and on the intensity of the copying light in this plane. If the pre-exposure is not too great in proportion to the total exposure necessary for copying the original with the greatest light-transmission, it appears to have only a slight influence on the results of the exposure. This influence consists in that the copies of originals with little light-transmission are exposed to a somewhat lower degree than those of originals with greater light-transmission. In fact, the differences become smaller as the total (dosed) exposure lasts longer.

When commonly used high-speed diazotype materials are employed, the deviations do not become inconvenient for practical purposes until the pre-exposure is, for example, one third of the total exposure. With diazotype materials of lower speed the pre-exposure may be relatively greater.

If photocell 15 is mounted near feeding limit 52, the photoprinting set instead of a pre-exposure receives a corresponding after-exposure. This causes analogous but more serious deviations.

FIGURE 4 represents a diagram for the dosage according to the invention with photochemical recording of the quantity of measuring light.

In this figure the pane is designated by 1 and the bed of a printing frame by 2. In bed 2 a window 3 is present. The numeral 9 denotes a mercury vapour lamp, 14 a reflector. Between pane 1 and bed 2 the photoprinting set consisting of original 10 and diazotype material 11 is present. The latter consists of base-paper of weight 40 g./m.$^2$ of good light-transmission, sensitized with 1-diazo-2,5-diethoxy-4-phenylbenzene.

Below the window, cell 30 is present, filled with an aqueous solution of 1-diazo-4-ethylbenzylamino-3-ethoxybenzene designated by 31. Solution 31 absorbs the measuring light emerging from the photoprinting set (arrow 25).

The measuring light decomposes diazo solution 31 and after the absorption of a given quantity of measuring light, light begins to fall from mercury vapour lamp 17 through interference filter 20 (405 millimicrons) via the small windows 26 and 27 onto the eye 32 of an observer. This commencement of visibility marks the point at which the dose has been reached.

For the calibration, the concentration of diazo solution 31 and/or the height of the liquid column above the line 17—32 are varied.

The light of light-source 17 (which falls into the cell through 26) is chosen to be so weak that it has no appreciable influence on the decomposition of the diazo solution 31.

At the place of eye 32 a photocell may naturally be present, which during the recording of the light can excite a relay with reaction-element.

We claim:

1. A process for the dosage of exposure during the transmission-copying of a positive line original on diazotype material which comprises exposing the material to light transmitted through the original, said light having a wave length that is transmitted in progressively increasing intensity by said material as the photolysis of the diazo compound in said material proceeds, impinging the quantity of said wave length which is transmitted by the original and said material during the copying operation upon a photoelectric cell having electric energy integrating means connected therewith, said quantity being substantially independent of the light transmission characteristics of the original, and terminating the exposure upon and in response to the quantity of electric energy received from said cell by said integrating means reaching a predetermined value.

2. The process for the dosage of exposure as claimed in claim 1 wherein said wave length is substantially that wave length for which the diazo compound of said material has its maximum absorption.

3. The process for the dosage of exposure as claimed in claim 1 wherein said material contains a para-diazo amino-benzene and said wave length is in the range of 360 to 436 millimicrons.

4. The process for the dosage of exposure as claimed in claim 1 wherein the material is exposed to the light from an arc lamp, the material contains a para-diazo dialkylaniline and said wave length is in the range of 360 to 400 millimicrons.

5. The process for the dosage of exposure as claimed in claim 1 wherein the material is exposed to the light from an actinically fluorescent mercury vapor lamp, the material contains a para-diazo di-substituted amino-benzene and said wave length is in the range of 385 to 425 millimicrons.

6. The process for the dosage of exposure as claimed in claim 1 wherein the material is exposed to the light from a high pressure mercury vapor lamp, the material contains a para-diazo monoalkylaniline and said wave length is substantially 365 millimicrons.

7. The process for the dosage of exposure as claimed in claim 1 wherein the material is exposed to the light from a high pressure mercury vapor lamp, the material contains a diazo-dialkylhydraquinone having an aryl group in the para position with respect to the diazo group; and said wave length is substantially 436 millimicrons.

References Cited in the file of this patent

UNITED STATES PATENTS

| | | |
|---|---|---|
| 1,925,547 | Tuttle et al. | Sept. 5, 1933 |
| 2,114,468 | Van Grinten | Apr. 19, 1938 |
| 2,269,161 | Morse | Jan. 6, 1942 |
| 2,353,218 | Burnham et al. | July 11, 1944 |
| 2,444,675 | Rath | July 6, 1948 |
| 2,572,930 | Heldens | Oct. 30, 1951 |
| 2,842,025 | Craig | July 8, 1958 |
| 2,857,555 | Koen et al. | Oct. 21, 1958 |
| 2,880,662 | Craig et al. | Apr. 7, 1959 |
| 2,921,512 | Craig | Jan. 19, 1960 |
| 2,933,011 | Wick et al. | Apr. 19, 1960 |